(12) United States Patent
Dong et al.

(10) Patent No.: US 9,063,296 B2
(45) Date of Patent: Jun. 23, 2015

(54) OPTICAL FIBER CONNECTOR, OPTICAL FIBER ADAPTER, AND ASSEMBLY THEREWITH

(71) Applicants: HONG FU JIN PRECISION INDUSTRY (SHENZHEN) CO., LTD., Shenzhen (CN); HON HAI PRECISION INDUSTRY CO., LTD., New Taipei (TW)

(72) Inventors: Min Dong, Shenzhen (CN); Jun-Jin Pan, Shenzhen (CN); Leland Wang, Santa Clara, CA (US)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 181 days.

(21) Appl. No.: 13/724,841

(22) Filed: Dec. 21, 2012

(65) Prior Publication Data

US 2013/0163933 A1   Jun. 27, 2013

(30) Foreign Application Priority Data

Dec. 27, 2011  (CN) .......................... 2011 1 0444188

(51) Int. Cl.
*G02B 6/36* (2006.01)
*G02B 6/38* (2006.01)

(52) U.S. Cl.
CPC ............... *G02B 6/36* (2013.01); *G02B 6/3816* (2013.01); *G02B 6/3825* (2013.01); *G02B 6/3893* (2013.01)

(58) Field of Classification Search
CPC ...... G02B 6/36; G02B 6/3816; G02B 6/3825; G02B 6/3869; G02B 6/3893
USPC ................................................. 385/77, 78, 81
See application file for complete search history.

(56) References Cited

U.S. PATENT DOCUMENTS

| 4,682,831 A * | 7/1987 | McNeel et al. ................ 439/294 |
| 7,744,286 B2 * | 6/2010 | Lu et al. ........................... 385/53 |
| 2007/0025666 A1 * | 2/2007 | Shibata et al. .................. 385/78 |
| 2013/0129285 A1 * | 5/2013 | Dong et al. ..................... 385/77 |

FOREIGN PATENT DOCUMENTS

| CN | 1851511 A | 10/2006 |
| CN | 201145752 Y | 11/2008 |
| TW | 200935109 A | 8/2009 |
| TW | 200937061 A | 9/2009 |

* cited by examiner

*Primary Examiner* — Daniel Petkovsek
(74) *Attorney, Agent, or Firm* — Novak Druce Connolly Bove + Quigg LLP

(57) ABSTRACT

A waterproof optical fiber assembly includes an optical fiber connector mating with an optical fiber adapter. The optical fiber connector includes a fiber joining head, a sealing member, a sleeve, a housing, and a boot. The sleeve defines an annular groove for receiving the sealing member and two latching protrusions adjacent to the annular groove, the housing defines two unlocking grooves for the two latching protrusions, the fiber joining head is sleeved in the sleeve adjacent to the annular groove, the housing is fitted around an end of the sleeve away from the fiber joining head. The optical fiber adapter includes an assembling seat including a base board, a barrel, and two elastic arms.

7 Claims, 8 Drawing Sheets

OPTICAL FIBER CONNECTOR, OPTICAL FIBER ADAPTER, AND ASSEMBLY THEREWITH

BACKGROUND

1. Technical Field

The present disclosure generally relates to an optical fiber assembly, and particularly to an optical fiber connector, an optical fiber adapter, and a waterproof optical fiber assembly using the optical fiber connector and the optical fiber adapter.

2. Description of the Related Art

As the fiber to the home (FTTH) becomes more and more used in the communications field, many waterproof optical fiber assemblies are used for connecting optical fiber cables in an outdoor environment where dust, moisture/humidity or other contaminants exist. A typical waterproof optical fiber connector includes a waterproof case. The waterproof case makes the optical fiber connector to be difficult to assemble and disassemble on an optical fiber adapter.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
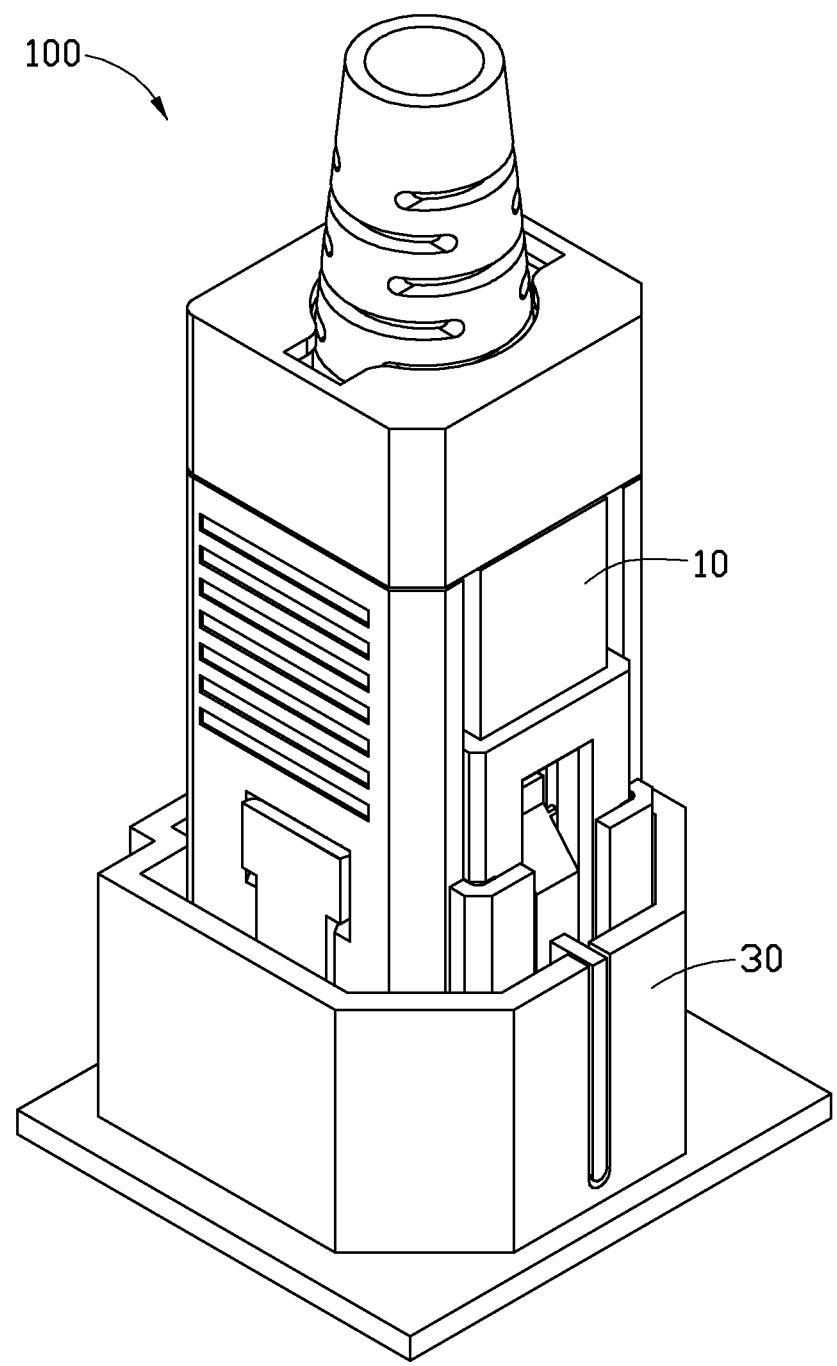
FIG. 1 is an isometric, assembled view of an exemplary embodiment of a waterproof optical fiber assembly.
Figure 2:
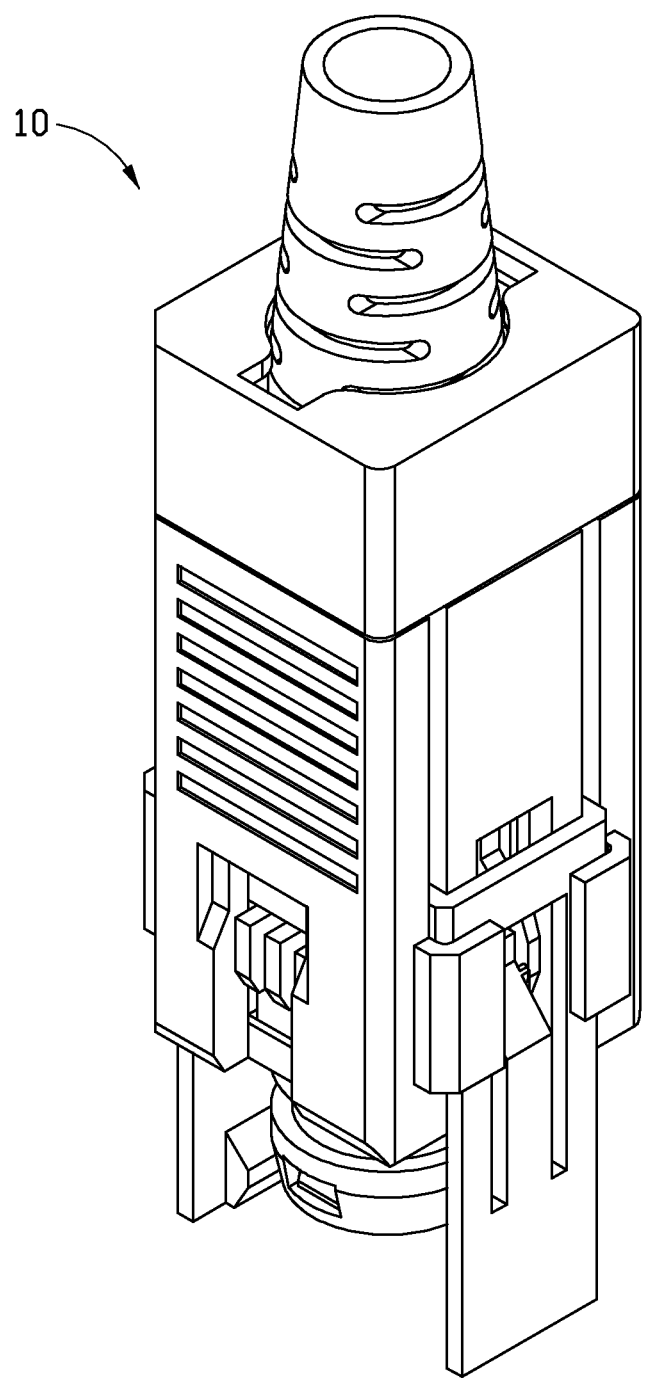
FIG. 2 is an isometric, assembled view of the optical fiber connector of the waterproof optical fiber assembly in FIG. 1.
Figure 3:
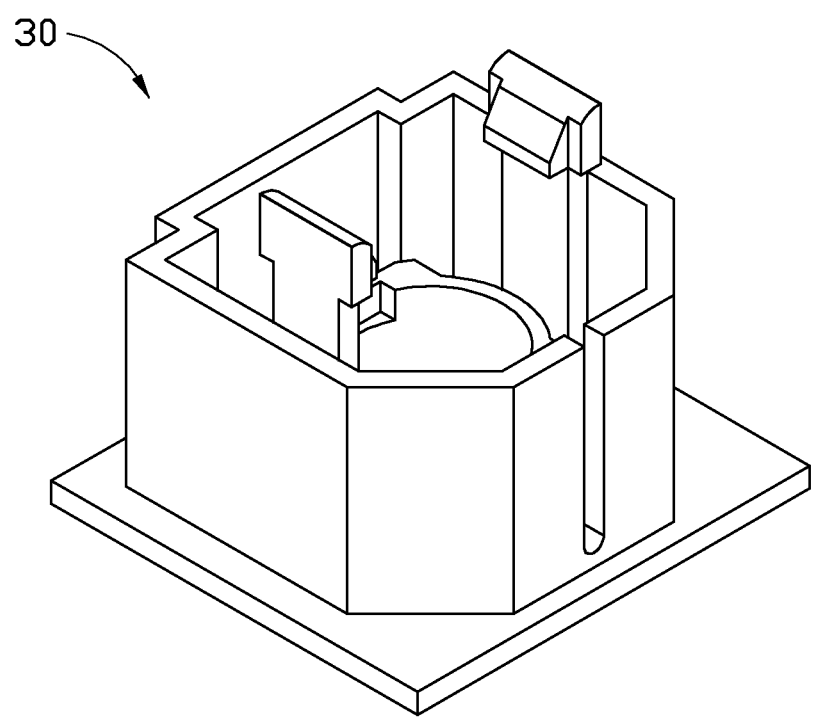
FIG. 3 is an isometric, assembled view of the optical fiber adapter of the waterproof optical fiber assembly in FIG. 1.

FIGS. 1 to 3 show an embodiment of a waterproof optical fiber assembly 100. The waterproof optical fiber assembly 100 includes an optical fiber connector 10 and an optical fiber adapter 30 mating with the optical fiber connector 10.

Figure 4:
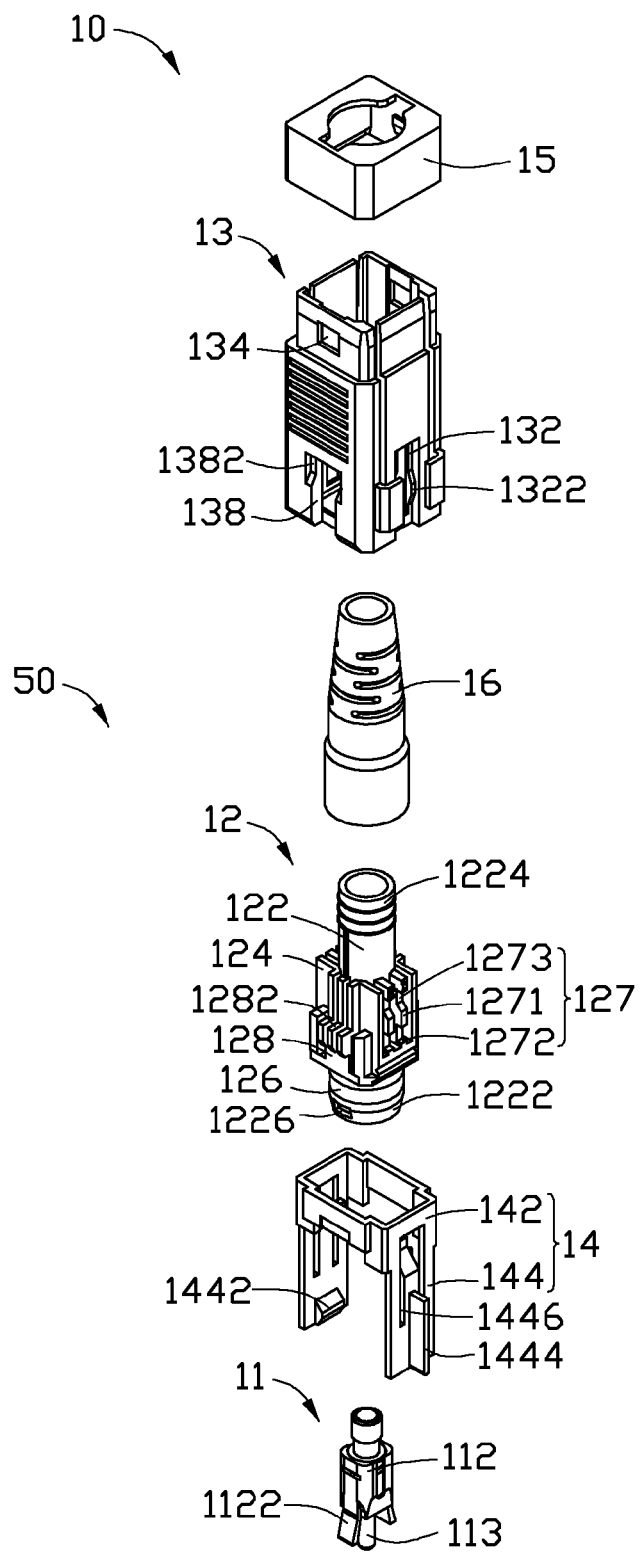
FIG. 4 is an exploded, isometric view of the optical fiber connector of FIG. 2.
Figure 5:
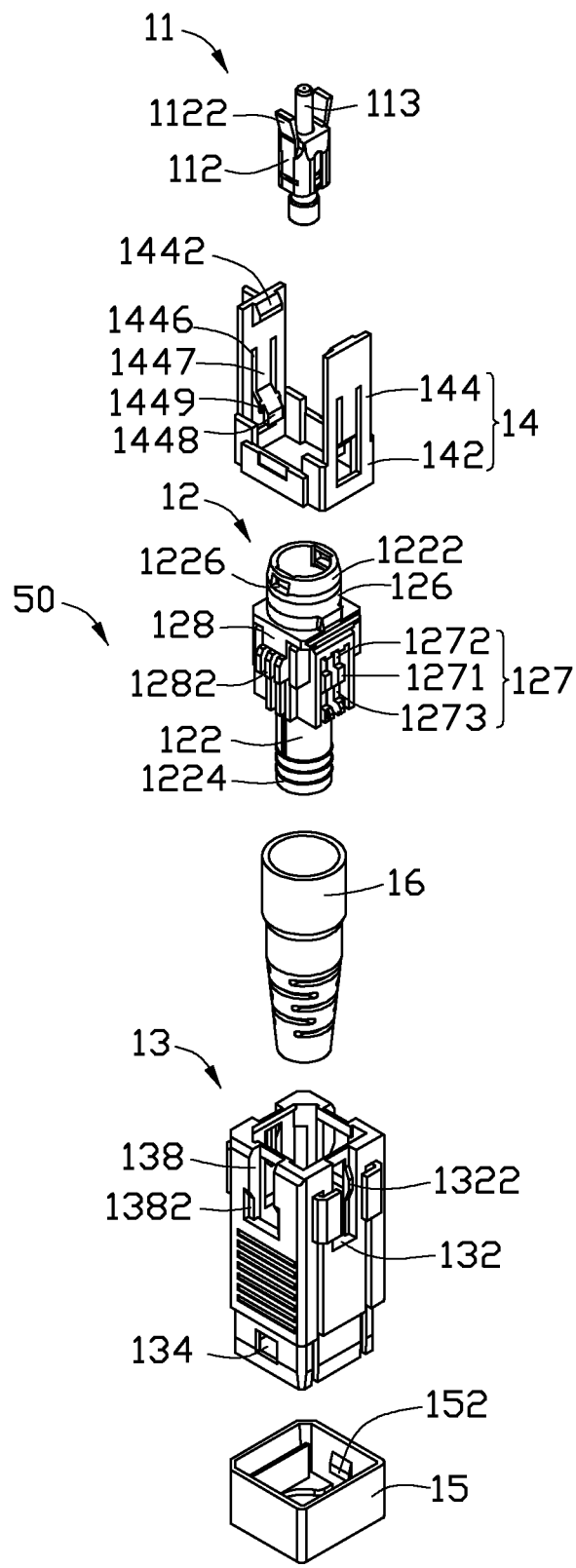
FIG. 5 is similar to FIG. 4, but viewed from another aspect.
Figure 6:
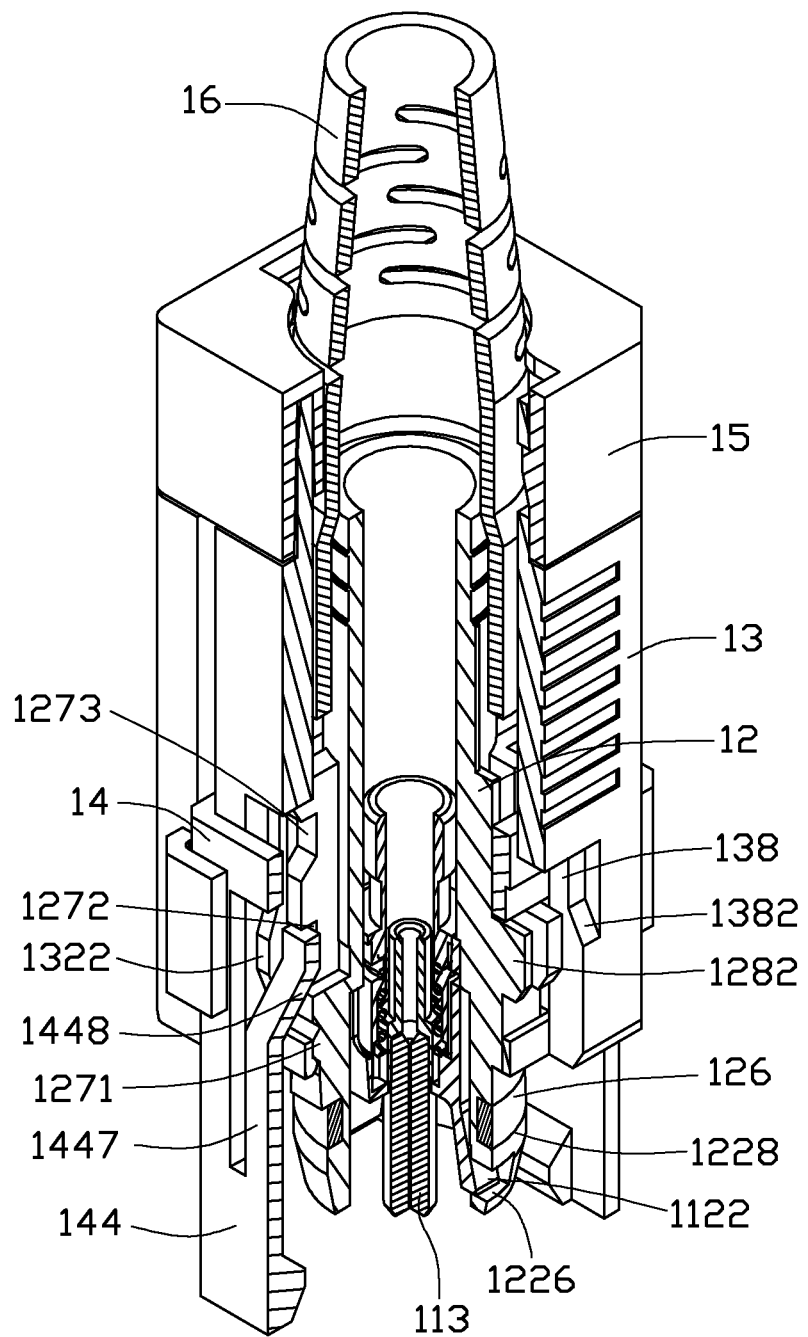
FIG. 6 is a cut-away view of the optical fiber connector of FIG. 2.

FIGS. 4 to 6 show an exemplary embodiment of the optical fiber connector 10. The optical fiber connector 10 includes a fiber joining head 11, a sleeve 12, a housing 13, a frame 14, a cover 15, and a boot 16. The sleeve 12, the housing 13, and the boot 16 together form a housing assembly 50. The fiber joining head 11 is firmly sleeved in a first end of the sleeve 12. The housing 13 and the frame 14 are fitted around the sleeve 12. The cover 15 is positioned on a distal end of the housing 13 opposite to the frame 14. The boot 16 is sleeved on a second end of the sleeve 12 and extends out of the cover 15.

The fiber joining head 11 includes a main body 112, and a core 113 received in an end of the main body 112. Two diametrically opposed latching arms 1122 are formed at the end of the main body 112 adjacent to the core 113.

The sleeve 12 includes a cylindrical portion 122 and a fixing portion 124 fitted around the cylindrical portion 122. The cylindrical portion 122 includes a first end 1222 and a second end 1224 opposite to the first end 1222. The first end 1222 defines two latching holes 1226 and an annular groove 1228 (as shown in FIG. 6) above the two latching holes 1226. In the illustrated embodiment, the sleeve 12 further includes a sealing member 126 received in the annular groove 1228.

The fixing portion 124 includes two stoppers 127 formed on opposite side surfaces thereof and two latching portions 128 formed on the other two opposite side surfaces. Each of the two stoppers 127 includes two stopping pieces 1271 parallel to the central axis of the optical fiber connector 10. Each of the two stopping pieces 1271 defines a first groove 1272 adjacent to the first end 1222 and a second groove 1273 away from the first end 1222. A chamfer (not labeled) is formed in an inner surface of each second groove 1273 adjacent to the first groove 1272. Each of the two latching portions 128 forms three latching protrusions 1282 parallel to the central axis of the optical fiber connector 10. In alternative embodiments, the number of the stopping pieces 1271 can be one, three, or more, and the number of the latching protrusions 1282 can be one or two or more.

The housing 13 defines two receiving grooves 132 in opposite sidewalls adjacent to an end of the housing 13, and the housing 13 further defines two latching grooves 134 in the other two opposite sidewalls of the housing 13 adjacent to the other end of the housing 13. The housing 13 further defines two unlocking grooves 138 in an end of the housing 13 opposite to the two latching grooves 134. A stepping portion 1322 is formed in each receiving groove 132. Each of the two unlocking grooves 138 defines a stepped groove 1382.

The frame 14 includes a base portion 142, and a pair of extending plates 144 extending from the base portion 142. Each extending plate 144 has a latching projection 1442 protruding out from the inner surface thereof away from the base portion 142. One of the pair of extending plates 144 forms a guiding portion 1444 parallel to the central axis of the optical fiber connector 10, and protruding out from the outer surface of the extending plate 144 away from the base portion 142. Each of the pair of extending plates 144 defines a rectangular through hole 1446 and a locking arm 1447 is formed in the through hole 1446. The locking arm 1447 forms a locking portion 1448 bending towards the interior of the frame 14. The locking portion 1448 has two resisting portions 1449 extending out from opposite sides thereof.

The cover 15 is fitted on an end of the housing 13 adjacent to the two latching grooves 134, for increasing the structural strength of the housing 13. Two latching blocks 152 are formed on opposite inner surfaces of the cover 15 corresponding to the two latching grooves 134 of the housing 13.

The boot 16 is sleeved on the second end 1224 of the sleeve 12. The boot 16 is conical and hollow, the larger diameter end of the boot 16 is firmly fastened to the sleeve 12 by adhesive, and a smaller diameter end of the boot 16 is firmly fastened to a cable sleeved in the optical fiber connector 10 by adhesive, to form a waterproof structure.

Referring to FIG. 6, in assembly of the optical fiber connector 10, the fiber joining head 11 is received in the first end 1222 of the sleeve 12 with the two latching arms 1122 latching in the two latching holes 1226. The sealing member 126 is received in the annular groove 1228. The boot 16 is firmly sleeved on the second end 1224 of the sleeve 12. The housing 13 is fitted around the sleeve 12 with the two stoppers 127 facing the two receiving grooves 132, and the two unlocking grooves 138 facing the two latching portions 128. The frame 14 is positioned from the first end 1222 of the sleeve 12, with each locking portion 1448 latching with one first groove 1272. The cover 15 is positioned on an end of the housing 13 away from the frame 14.

As the two locking portions 1448 of the frame 14 are latched in the two first grooves 1272 of the sleeve 12, any axial movement of the frame 14 towards the second end 1224 of the sleeve 12 is prevented. When the optical fiber connector 10 is dropped, jarred, or struck by another object, the pair of extending plates 144 of the frame 14 prevents the core 113 from being damaged.

The cover 15 is used for increasing the structural strength of the housing 13. In an alternative embodiment, the cover 15 can be omitted.

Figure 7:
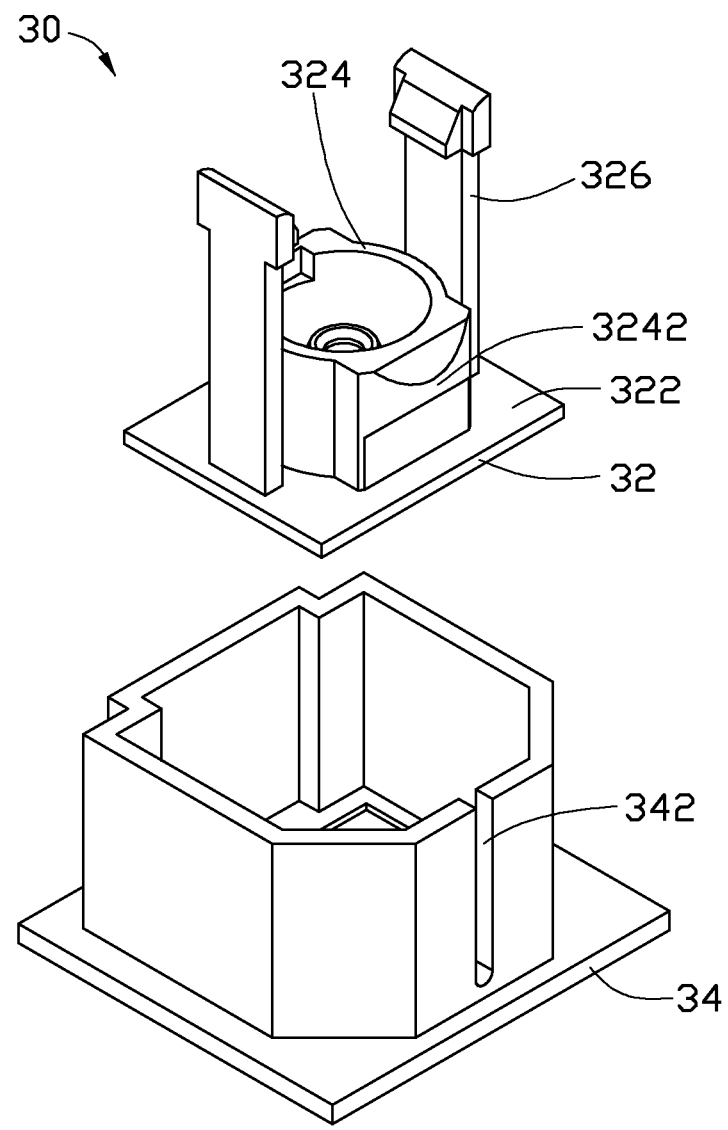
FIG. 7 is an exploded, isometric view of the optical fiber adapter of FIG. 3.

FIG. 7 shows an embodiment of the optical fiber adapter 30. The optical fiber adapter 30 includes an assembling seat 32 and an outer housing 34 fitted around the assembling seat 32. The assembling seat 32 includes a base board 322, a barrel 324 protruding from a central area of the base board 322, and two elastic arms 326 protruding from the base board 322 and positioned at opposite sides of the barrel 324. Two protrusions 3242 protrude from opposite ends of the outer surface of the barrel 324. The outer housing 34 defines a guiding groove 342 corresponding to the guiding portion 1444 of the frame 14.

Figure 8:
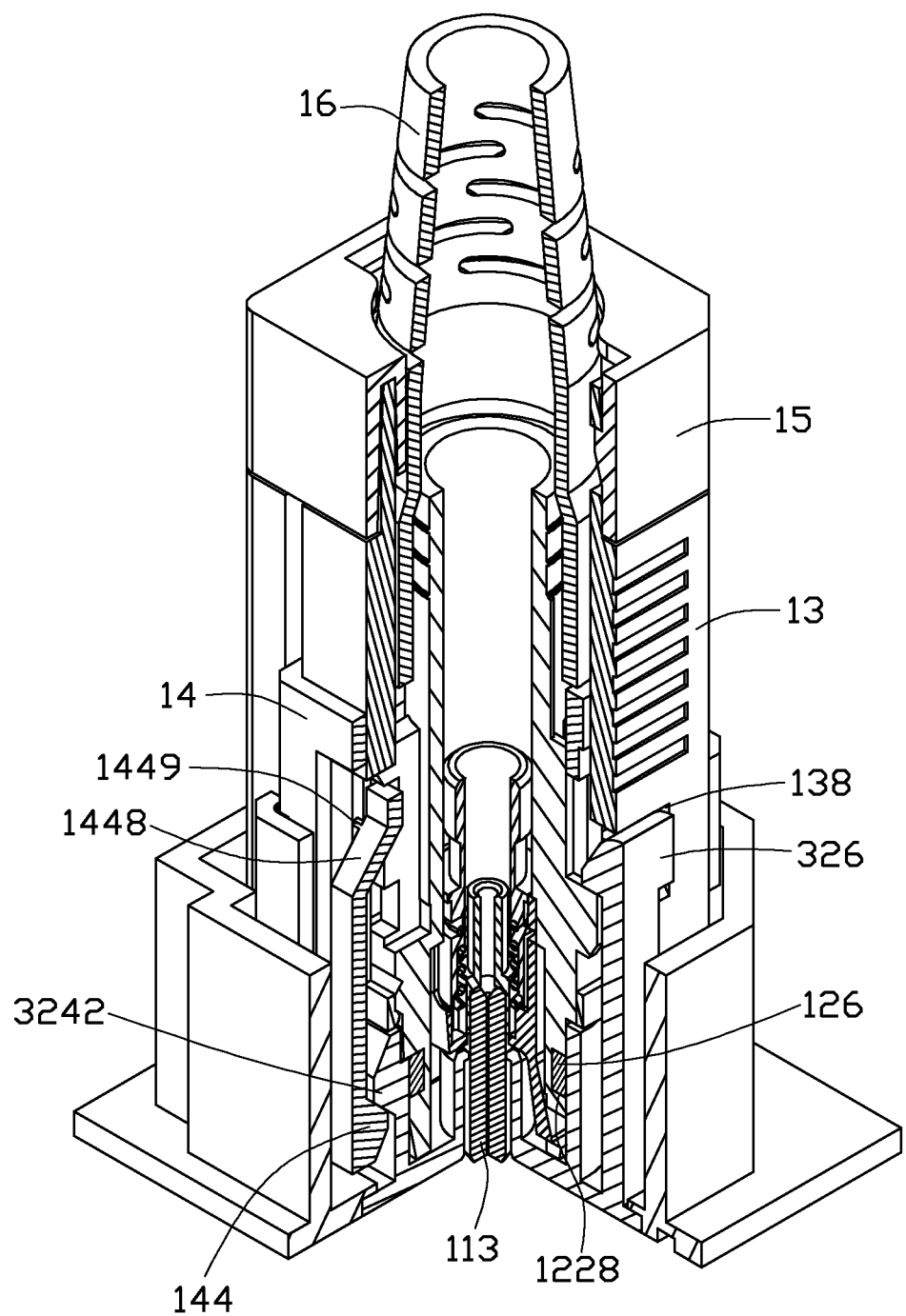
FIG. 8 is a cut-away view of the waterproof optical fiber assembly of FIG. 1.

FIGS. 6 and 8 show the optical fiber connector 10 being assembled to the optical fiber adapter 30 in line with the central axis of the optical fiber connector 10. The guiding portion 1444 of the frame 14 is inserted into the guiding groove 342 of the optical fiber adapter 30 (as shown in FIG. 1) until the pair of latching projections 1442 latch with the two protrusions 3242. The housing 13 is pushed towards the optical fiber adapter 30. The resisting of the two stepping portions 1322 of the housing 13 against the two resisting portions 1449 of the frame 144 bends the two locking arms 1447 elastically away from the sleeve 12, to unlock each locking portion 1448 and one first groove 1272. Each locking portion 1448 slides to latch with one second groove 1273. In addition, the optical fiber connector 10 is pushed towards the optical fiber adapter 30 until the two elastic arms 326 latch with the two latching portions 128.

When the optical fiber connector 10 needs to be disassembled from the optical fiber adapter 30, the housing 13 is pulled away from the optical fiber adapter 30. The resisting of the bottom of each of the two stepped grooves 1382 against the two elastic arms 326 bends the two elastic arms 326 elastically away from the sleeve 12, to unlock the two elastic arms 326 and the two latching portions 128. Continuing to pull on the housing 13, the two locking portions 1448 slide along the chamfer of the second groove 1273, with the help of the two elastic arms 326 latching the two latching portions 128. The frame 14 is then returned to its original state (as shown in FIG. 6). Assembly and disassembly of the waterproof optical fiber assembly 100 is very easy.

Due to the guiding portion 1444 mating with the guiding groove 342, the optical fiber connector 10 can be easily assembled on the optical fiber adapter 30 without the possibility of error. In alternative embodiments, the outer housing 34 can be omitted, and the guiding portion 1444 of the frame 14 can be omitted accordingly.

While the present disclosure has been described with reference to particular embodiments, the description is merely illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A waterproof optical fiber assembly, comprising:
an optical fiber connector comprising:
a fiber joining head,
a sealing member;
a sleeve including two latching protrusions and an annular groove, the fiber joining head sleeved in a first end of the sleeve;
a housing fitted around on an end of the sleeve, the housing defining two unlocking grooves corresponding to the two latching protrusions; and
a boot sleeved on a second end of the sleeve;
an optical fiber adapter mating with the optical fiber connector, the optical fiber adapter comprising an assembling seat comprising a barrel for receiving the optical fiber connector, and two elastic arms latching with the two latching protrusions, wherein the sealing member is received in the annular groove and resists with the inner surface of the barrel;
a frame positioned on an end of the sleeve adjacent to the fiber joining head, wherein the frame comprises a base portion, a pair of extending plates extending from the base portion, the barrel forms two protrusions protruding out from the outer surface of the barrel of the assembling seat for latching with the pair of extending plates; and
a cover fitted on a distal end of the housing away from the housing for increasing the structure strength of the housing.

2. The waterproof optical fiber assembly of claim 1, wherein each of the two unlocking grooves defines a stepped groove, and the two elastic arms are configured for sliding along the two stepped grooves to unlock the two elastic arms and the two latching protrusions.

3. The waterproof optical fiber assembly of claim 1, wherein the sleeve includes a cylindrical portion and a fixing portion formed on the outer surface of the cylindrical portion, and the cylindrical portion defines the annular groove in the outer surface thereof adjacent to the fixing portion.

4. The waterproof optical fiber assembly of claim 3, wherein the fixing portion includes two latching portions formed on opposite side surfaces thereof, and the two latching protrusions formed on the two latching portions, respectively.

5. The waterproof optical fiber assembly of claim 1, wherein the fixing portion forms two stoppers, each of the two stoppers comprises two stopping pieces, the stopping piece defines a first groove and a second groove, each of the pair of extending plates defines a through hole and a locking arm in the through hole, and the locking arm has a locking portion and two resisting portions, the housing defines two receiving grooves, each of the two receiving grooves forms a stepping portion, and each of the two resisting portions is capable of sliding along one corresponding stepping portion to latch the locking portion with the first groove or the second groove.

6. The waterproof optical fiber assembly of claim 1, wherein one of the pair of extending plates forms a guiding portion parallel to the central optical axis of the optical fiber connector protruding out from the outer surface thereof away from the base portion, the optical fiber adapter further comprises an outer housing sleeved on the assembling seat, and the outer housing defines a guiding groove corresponding to the guiding portion.

7. The waterproof optical fiber assembly of claim 1, wherein the cover forms two latching blocks on opposite inner surfaces of the cover, and the housing further defines two latching grooves in an end thereof away from the two unlocking grooves for latching with the two latching blocks.

* * * * *